United States Patent [19]
Honma

[11] Patent Number: 5,419,878
[45] Date of Patent: May 30, 1995

[54] EXHAUST PURIFYING DEVICE

[75] Inventor: Hideaki Honma, Saitama, Japan

[73] Assignee: Sankei Giken Kogyo Kabushiki Kaisha, Tokyo, Japan

[21] Appl. No.: 255,906

[22] Filed: Jun. 8, 1994

Related U.S. Application Data

[63] Continuation of Ser. No. 21,233, Feb. 23, 1993, abandoned.

[30] Foreign Application Priority Data

Feb. 28, 1992 [JP] Japan .................. 4-009702 U

[51] Int. Cl.6 ............................................. B01D 53/46
[52] U.S. Cl. ..................................... 422/177; 422/179; 422/180; 60/300; 60/301; 60/302
[58] Field of Search ..................... 422/177, 179, 180; 60/300, 301, 302; 423/213.2

[56] References Cited

U.S. PATENT DOCUMENTS 4,795,615  1/1989  Cyron et al. ................... 422/179
5,137,696  8/1992  Hitachi et al. .................... 60/301

Primary Examiner—Timothy M. McMahon
Attorney, Agent, or Firm—Birch, Stewart, Kolasch & Birch

[57] ABSTRACT

An exhaust purifying device applicable to an exhaust system extending from an internal combustion engine has a casing and a core received in the casing. The core has a honeycomb structure implemented by a corrugated sheet metal and a flat sheet metal rolled up together in a spiral configuration. Part of the flat sheet forming the outer periphery of the core is formed with a plurality of openings. The core is locally affixed to the casing by a solder applied to the portions of the flat sheet surrounding the openings and opposite edges of the flat sheet. This is successful in surely and stably affixing the core to the casing despite that the solder is implemented as an inexpensive powdery solder.

4 Claims, 3 Drawing Sheets

EXHAUST PURIFYING DEVICE

This application is a continuation of application Ser. No. 08/021,233, filed on Feb. 23, 1993, now abandoned.

BACKGROUND OF THE INVENTION

1. Field of the Invention

The present invention relates to an exhaust purifying device applicable to the exhaust system of an internal combustion engine, e.g., an automobile internal combustion engine and, more particularly, to an exhaust purifying device of the type including a core provided with a honeycomb structure and applied with a catalyst.

2. Description of the Related Art

An exhaust purifying device of the type described, i.e., a so-called catalytic converter has customarily been designed to communicate to the exhaust system of, for example, an automobile for promoting the oxidation of exhaust gases emanating from the exhaust system. Specifically, the catalytic converter is associated with an exhaust pipe extending from an engine or a muffler and applied with a catalyst for reducing the concentration s of carbon monoxide, hydrocarbons and other toxic gases contained in the exhaust. One type of conventional catalytic converter has a hollow cylindrical casing and a metallic core received in the casing and is provided with a honeycomb structure. A catalyst is applied to the metallic core. The casing is affixed to a predetermined portion of the exhaust pipe as the muffler of the exhaust system. Specifically, the core having a honeycomb structure is implemented by a corrugated sheet of stainless steel or similar metal, and a flat sheet also made of metal. The corrugated sheet and flat sheet are superposed on each other and rolled up together in a spiral configuration. The core is inserted into and affixed to the inner periphery of the cylindrical casing by a solder. A nickel powder is one of the solders available for such an application. To affix the core to the casing, three different methods are available, including one which mixes a binder with a solder to prepare a paste and applies it to the outer periphery of the core (referred to as a first method hereinafter), one which applies an adhesive to the outer periphery of the core beforehand and then deposits a solder on the adhesive (referred to as a second method hereinafter), and one which wraps an amorphous solder in the form of foil around the core (referred to as a third method hereinafter).

The first to third conventional methods described above each has some problems left unsolved, as follows. The first method has a problem that when the core is inserted into the casing, the solder on the outer periphery of the core is sequentially forced out from one end of the casing due to the friction acting between the core and the casing. This makes it difficult to supply a required amount of solder as far as a predetermined position. The problem with the second method is that it is difficult to supply the solder between the core and the casing since a gap is not available therebetween. Therefore, the connection relying on the first method or the second method fails to firmly affix the core and casing. Assume that such a defective catalytic converter is mounted on the muffler or the exhaust pipe. Then, it is likely that the core is separated from the casing due to, for example, the vibration of the vehicle body and the pressure of the exhaust and thereby moved within the casing, causing the catalyst to come off from the surface of the core.

The third method is superior to the first method since it distributes the solder uniformly over the entire outer periphery of the core without the intermediary of a binder. However, the foil of amorphous solder is expensive and has to be wound by an extra and complicated step. Moreover, the foil is wound around the entire outer periphery of the core and affixed to the entire inner periphery of the casing. This brings about another problem that when the core and the casing each expands and contracts in a particular manner due to the high-temperature and high-pressure exhaust, the interior of the core is likely to sequentially deform since the difference in expansion and contraction cannot be absorbed. Then, the core is rapidly deteriorated, i.e., the honeycomb structure is rapidly distorted to make the passage of the exhaust irregular. This prevents the catalyst from exhibiting the expected function.

SUMMARY OF THE INVENTION

It is, therefore, an object of the present invention to provide an exhaust purifying device allowing a core thereof to be affixed to a casing by a solder which is relatively inexpensive and can be applied without a complicated step.

It is another object of the present invention to provide an exhaust purifying device allowing a core thereof to be surely affixed to a casing and suffering from only a minimum of deterioration due to aging.

An exhaust purifying device for an internal combustion engine of the present invention comprises a casing made of metal and forming part of an exhaust passage extending from the internal combustion engine, and a core made of metal and received in the casing. The core has a honeycomb structure and is applied with a catalyst for promoting the oxidation of exhaust gases emanating from the internal combustion engine. Further, means are provided for affixing only part of the outer periphery of the core to a corresponding part of the inner periphery of the casing.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
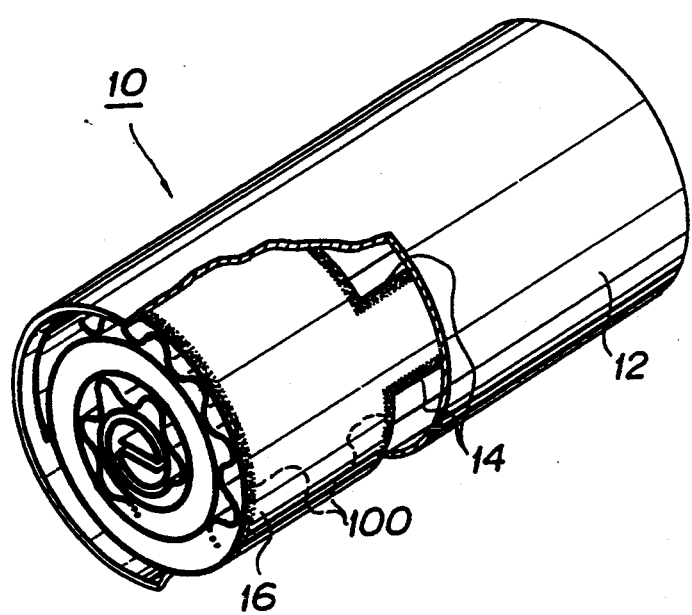
FIG. 1 is a partly taken away perspective view showing an exhaust gas purifying device embodying the present invention.

Referring to FIG. 1 of the drawings, an exhaust purifying device or catalytic converter embodying the present invention is shown and generally designated by the reference numeral 10. As shown, the catalytic converter 10 has a hollow cylindrical casing 12 and a core 16 received in the casing 12. The core 12 is provided with a honeycomb structure as viewed in a section and affixed to the casing 12 by a solder 100. A plurality of openings 14 are formed through the core 12 at equally spaced locations along the circumference of the core 12.

One end or both ends of the cylindrical casing 12 are soldered or otherwise affixed to the intermediate portion of an exhaust pipe as a muffler of, for example, an automobile or a motorcycle, forming part of an exhaust passage. The casing 12, like the exhaust pipe as the muffler, is implemented by a sheet metal mechanically strong enough to resist high-temperature and high-pressure exhaust gases. While the casing 12 is shown as having a circular cross-section, it may alternatively be provided with an elliptical cross-section, a partly curved rectangular cross-section or similar cross-section so long as it matches the configuration of the exhaust pipe or that of the muffler.

Figure 2:
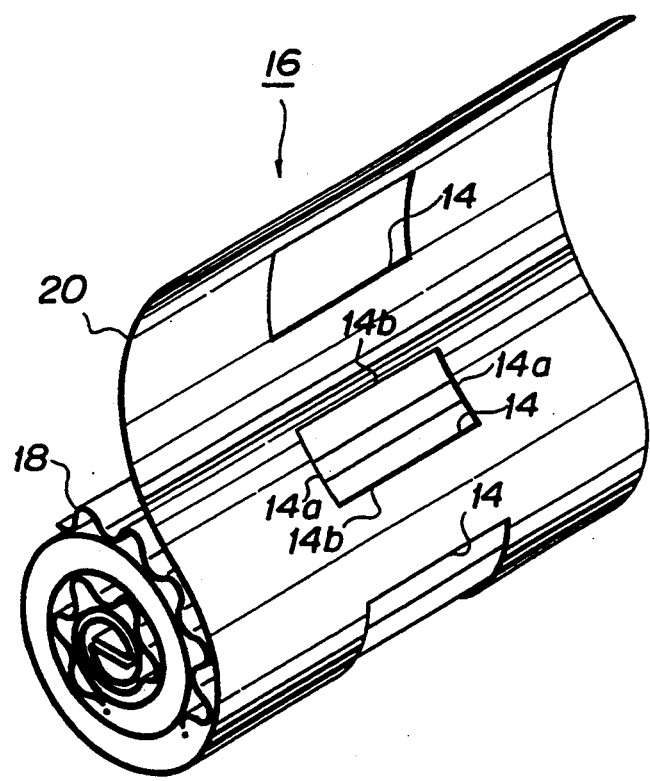
FIG. 2 is a perspective view showing a core included in the embodiment specifically.

As shown in FIG. 2, the core 16 is made up of a corrugated vent sheet 18 and a flat partition sheet 20 which are superposed on each other. The vent sheet 18 and partition sheet 20 are rolled up in a spiral to constitute a honeycomb structure. A s a result, the honeycomb structure has a plurality of exhaust passageways or cells partitioned both in the radial direction and in the circumferential direction of the core 16. In the embodiment, the partition sheet 20 forms the outermost surface of the honeycomb structure. Particularly, in the embodiment, the part of the partition sheet 20 forming the outermost surface as stated above is formed with the previously mentioned plurality of openings 14. The openings 14 are each provided with a rectangular shape. Specifically, the vent sheet 18 is constituted by a thin webbing of metal corrugated by a corrugation molding machine. A coating of platinum, palladium, rhodium or similar catalytic substance is provided on both surfaces of the vent sheet 18. For example, the vent sheet 18 is formed of a thin sheet of stainless steel which is resistive to the pressure and heat of exhaust gases and flexible enough to be rolled up. Rolled up in a spiral together with the partition sheet 20, the vent sheet 18 defines a number of e x h a u s t passageways or cells along the circumference of the core 16 and each extending in the axial direction of the core 16. The vent sheet 18, therefore, allows exhaust gases to contact the catalyst over a broad area.

The partition sheet 20, like the vent sheet 18, is formed of a thin webbing of, for example, stainless steel and provided on both surfaces thereof with a coating of a catalyst selected from, for example, metals belonging to the eighth group of the periodic table. Typical of such metals may be platinum, nickel, copper, and palladium. To form the honeycomb structure, the partition sheet 20 is first laid along the bottom portions of the corrugations of the vent sheet 18 to form a core portion. Then, the sheet 20 is spirally wound along such bottom portions of the sheet 18 to form cells in the radial direction of the honeycomb structure. As a result, the sheet 20 covers the upper and lower channels of the sheet 18 to guarantee a substantial area over which the exhaust from an engine contacts the catalysts. Finally, the sheet 20 is wrapped around the peak portions of the outermost part of the sheet 18, thereby forming the outermost layer or outer periphery of the core 16. The sheet 20 is affixed to the peak portions and bottom portions of the sheet 18 by soldering or similar technology. The openings 14 are formed through the sheet 20 beforehand such that they will appear on the outer periphery of the core 16.

In the illustrative embodiment, the rectangular openings 14 are each preferably delimited by edges 14a parallel to the edges of the core 16, and edges 14b parallel to the axis of the core 16. The edges 14b may each preferably have a length which is substantially one-third of the width of the partition sheet 20 while the edges 14a may each have a length which is substantially one-eighth of the circumference of the sheet 20. The openings 14 are positioned at substantially equally spaced locations along the circumference of the core 16, as stated earlier.

Figure 3:
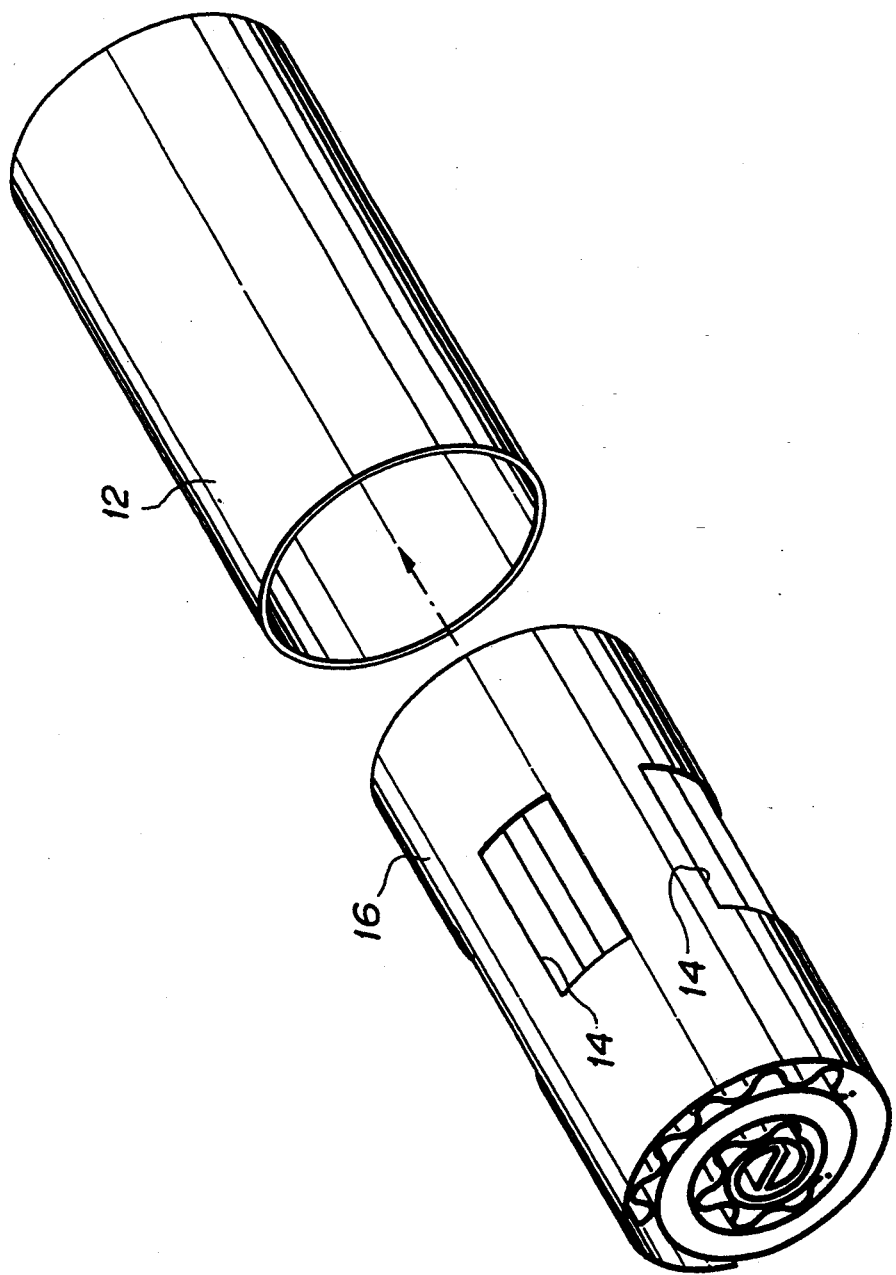
FIG. 3 is an exploded perspective view of the embodiment.

As shown in FIG. 3, the core 16 having the above configuration is received in and soldered to the cylindrical casing 12. A solder may be implemented as a nickel powder which exhibits desirable heat resistivity after deposition. In the embodiment, the casing 12 is immersed in a volatile binder beforehand so as to apply the binder to the inner periphery of the casing 12. The binder is an adhesive exerting a predetermined degree of adhering force and allowing the solder to deposit thereon. Specifically, the powdery solder is deposited on the casing 12 applied with the binder and on the core 16 received in the casing 12 repetitively at predetermined intervals. As a result, the binder is left without volatilizing at the portions of the core 16 surrounding the openings 14, opposite edge portions of the core 16, and the portions of the core 16 where the two sheets 18 and 20 contact each other. Hence, the solder is deposited on such portions of the core 16 via the binder. The resulting assembly of the core 16 and casing 12 is put in a high-temperature furnace to melt the solder. Consequently, the casing 12 and core 16 are affixed together, and at the same time the two sheets 18 and 20 are affixed together.

The catalytic converter 10 constructed as described above is welded or otherwise connected to the intermediate portion of the exhaust pipe as the muffler of an automobile or similar automotive vehicle. In this condition, the exhaust from an engine mounted on the vehicle flows into the core 16 via the end or one of opposite ends of the core 16 connected to the exhaust pipe as the muffler. Then, the exhaust is distributed to and flows through the number of passageways formed in the honeycomb structure by the corrugated portions of the vent sheet 18 and the partition sheet 20. At this instant, oxidation of the high-temperature exhaust is promoted by the catalysts existing on the sheets 18 and 20. As a result, the exhaust coming out via the other end of the core 16 contains a minimum of carbon monoxide, hydrocarbons and other toxic components.

As stated above, in the catalytic converter 10, the part of the partition sheet 18 forming the outer periphery of the core 16 is formed with a plurality of rectangular openings 14. The solder 100 is applied to the portions of the partition sheet 18 surrounding the openings and opposite edges of the sheet 18, thereby affixing the sheet 18 to the inner periphery of the cylindrical casing 12. As a result, the core 16 is surely and stably affixed to the casing 12 despite the use of a relatively inexpensive powdery solder.

Since the core 16 is firmly affixed to the casing 12 as stated above, the former is prevented from being separated from the latter despite the pressure of the high-temperature and high-pressure exhaust flowing into the core 16 via one end of the core 16. Should the core 16 be dislocated in the casing 12, there would occur various kinds of defects, e.g., the catalyst on the core 16 would come off. Particularly, in the embodiment, the openings 14 are delimited by the edges 14a parallel to the edges of the core 16 and the edges 14b parallel to the axis of the core 16 and are positioned at equally spaced locations along the circumference of the core 16. This maintains the outer periphery of the core 16 in uniform contact with the inner periphery of the casing 12 and, therefore, insures firm connection despite the pressure of the exhaust. In addition, heat from the core 16 is uniformly radiated to the casing 12. At this instant, the core 16 and the casing 12 each expands and contracts in a particular manner due to the hot exhaust. However, since the core 12 and casing 12 are only locally soldered to each other, non-soldered portions alternate with soldered portions and surely absorb the difference in expansion and contraction between them. This is successful in protecting the honeycomb structure from deformation in the core 16 and in insuring the expected catalytic function.

In summary, it will be seen that the present invention provides an exhaust purifying device which surely affixes a core having a honeycomb structure to a casing despite a simple and economical configuration thereof.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, while the embodiment has been shown and described in relation to the muffler or the exhaust pipe associated with an automotive internal combustion engine, it may, of course, be applicable to between any other internal combustion engine and an exhaust pipe associated therewith. The rectangular openings 14 of the core 16 are only illustrative and may be replaced with circular, polygonal or any other suitable openings. Further, any number of such openings 14 may be arranged at any suitable intervals so long as they allow the core 16 to be uniformly affixed to the inner periphery of the casing 12.

What is claimed is:

1. An exhaust purifying device for reducing toxic components contained in an exhaust emanating from an internal combustion engine, comprising:

a honeycomb core formed by winding a set of corrugated-sheet metal and plain sheet metal longer than said corrugated-sheet metal by one turn when wound in the manner that a plurality of openings are formed in radially and longitudinally even positions on the outermost winding thereof, said honeycomb core being applied with a catalyst for promoting oxidation of the exhaust; and a casing made of sheet metal to be connected to an intermediate portion of an exhaust pipe as a muffler and to form part of an exhaust passage extending from the internal combustion engine;

said core being inserted into said casing and soldered by applying solder onto said corrugated-sheet metal wound therein through said plurality of openings, on end portions and circumference of said plurality of openings of said outermost winding, and an inner surface of said casing.

2. The device as claimed in claim 1, wherein each of said plurality of openings of said core is of a regular form.

3. The device as claimed in claim 1, wherein winding of said set of corrugated-sheet metal and plain sheet metal is initiated from an end-to-end superposed portion adjoining each other.

4. The device as claimed in claim 1, wherein winding of said set of corrugated-sheet metal and plain sheet metal is initiated from a superposed end thereof.

* * * * *